United States Patent
Mohen et al.

(10) Patent No.: US 10,248,670 B1
(45) Date of Patent: Apr. 2, 2019

(54) METHOD AND SYSTEM FOR MIGRATING CONTENT BETWEEN ENTERPRISE CONTENT MANAGEMENT SYSTEMS

(71) Applicant: Open Text Corporation, Waterloo (CA)

(72) Inventors: Michael T. Mohen, Millington, MD (US); Christopher Dyde, Haddonfield, NJ (US)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 13/910,342

(22) Filed: Jun. 5, 2013

Related U.S. Application Data

(60) Provisional application No. 61/782,238, filed on Mar. 14, 2013.

(51) Int. Cl.
*G06F 17/30* (2006.01)

(52) U.S. Cl.
CPC .................................. *G06F 17/303* (2013.01)

(58) Field of Classification Search
None
See application file for complete search history.

(56) References Cited

U.S. PATENT DOCUMENTS

| | | | |
|---|---|---|---|
| 5,210,824 A | 5/1993 | Putz | |
| 5,550,976 A | 8/1996 | Henderson et al. | |
| 6,381,600 B1 | 4/2002 | Lau | |
| 6,408,342 B1 | 6/2002 | Moore | |
| 6,772,107 B1 | 8/2004 | La Cascia, Jr. | |
| 6,795,868 B1 | 9/2004 | Dingman et al. | |
| 7,853,553 B2 | 12/2010 | Lankinen et al. | |
| 7,945,551 B1 | 5/2011 | Alpern | |
| 8,087,647 B2 | 1/2012 | Endo | |
| 9,697,484 B1 | 7/2017 | Mohen et al. | |
| 1,010,891 A1 | 10/2018 | Mohen et al. | |
| 2001/0049753 A1 | 12/2001 | Gary | |
| 2005/0010919 A1 | 1/2005 | Ramanathan | |

(Continued)

OTHER PUBLICATIONS

Office Action for U.S. Appl. No. 13/926,573, dated Apr. 20, 2015, 12 pages.

(Continued)

*Primary Examiner* — Hosain T Alam
*Assistant Examiner* — Nicholas E Allen
(74) *Attorney, Agent, or Firm* — Sprinkle IP Law Group

(57) ABSTRACT

Migrating content between enterprise content management systems is described. A source object identifier is identified for metadata tables for content for a source enterprise content management system, based on a migration job definition. The metadata tables are retrieved from the source enterprise content management system, based on the source object identifier. A target object identifier is identified for a target enterprise content management system, based on the metadata tables and the migration job definition. An object identifier map is created that maps the source object identifier to the target object identifier. The metadata tables are stored to the target enterprise content management system, based on the object identifier map. The content for the source enterprise content management system is retrieved. The content is stored as content for the target enterprise content management system.

17 Claims, 3 Drawing Sheets

(56) References Cited

U.S. PATENT DOCUMENTS

| | | |
|---|---|---|
| 2005/0033726 A1* | 2/2005 | Wu et al. ............................ 707/1 |
| 2005/0131970 A1* | 6/2005 | Salazar et al. ................. 707/205 |
| 2005/0187974 A1 | 8/2005 | Gong |
| 2005/0243604 A1* | 11/2005 | Harken et al. ............ 365/185.22 |
| 2005/0251533 A1 | 11/2005 | Harken |
| 2005/0256892 A1 | 11/2005 | Harken |
| 2006/0064416 A1 | 3/2006 | Sim-Tang |
| 2006/0212486 A1 | 9/2006 | Kennis |
| 2006/0235899 A1* | 10/2006 | Tucker ........................... 707/200 |
| 2007/0156754 A1 | 7/2007 | Busch |
| 2007/0185926 A1 | 8/2007 | Prahlad et al. |
| 2007/0220022 A1 | 9/2007 | Lankinen et al. |
| 2008/0027944 A1 | 1/2008 | Itikarlapalli |
| 2009/0063504 A1* | 3/2009 | Banister et al. ................. 707/10 |
| 2009/0077094 A1 | 3/2009 | Bodain |
| 2009/0077114 A1 | 3/2009 | Zachariah |
| 2009/0182716 A1 | 7/2009 | Everhart |
| 2009/0228527 A1* | 9/2009 | Wang .................... G06F 3/0617 |
| 2009/0254572 A1 | 10/2009 | Redlich |
| 2010/0010968 A1 | 1/2010 | Redlich |
| 2010/0185700 A1 | 7/2010 | Bodain |
| 2010/0223608 A1 | 9/2010 | DeHaan |
| 2011/0010518 A1 | 1/2011 | Kavuri et al. |
| 2011/0066593 A1 | 3/2011 | Ahluwalia |
| 2011/0107327 A1* | 5/2011 | Barkie ...................... G06F 8/63 717/176 |
| 2011/0153697 A1* | 6/2011 | Nickolov et al. ............. 707/827 |
| 2012/0030247 A1* | 2/2012 | Yambal et al. ................ 707/802 |
| 2012/0054556 A1* | 3/2012 | Grube et al. .................... 714/42 |
| 2012/0054731 A1* | 3/2012 | Aravamudan et al. ....... 717/170 |
| 2012/0066179 A1* | 3/2012 | Saika ............................ 707/634 |
| 2012/0089711 A1* | 4/2012 | Zager et al. ................... 709/221 |
| 2012/0109940 A1 | 5/2012 | Ishii et al. |
| 2012/0143831 A1 | 6/2012 | Amulu |
| 2012/0265726 A1* | 10/2012 | Padmanabhan et al. ..... 707/602 |
| 2012/0330911 A1* | 12/2012 | Gruenheid ........ G06F 17/30303 707/694 |
| 2013/0024634 A1* | 1/2013 | Shitomi ........................ 711/162 |
| 2013/0124503 A1 | 5/2013 | Ishii |
| 2013/0166855 A1 | 6/2013 | Batwara et al. |
| 2013/0173547 A1 | 7/2013 | Cline et al. |
| 2013/0282751 A1 | 10/2013 | Lagerblad |
| 2014/0040182 A1 | 2/2014 | Gilder et al. |
| 2014/0222872 A1 | 8/2014 | Rambo et al. |
| 2015/0339359 A1 | 11/2015 | Takaoka et al. |
| 2017/0262777 A1 | 9/2017 | Mohen et al. |

OTHER PUBLICATIONS

Office Action for U.S. Appl. No. 13/926,601, dated Aug. 7, 2015, 8 pages.

Office Action for U.S. Appl. No. 13/926,573, dated Oct. 23, 2015, 17 pages.

Office Action for U.S. Appl. No. 13/926,601, dated Dec. 30, 2015, 8 pages.

Office Action for U.S. Appl. No. 13/926,573, dated Feb. 9, 2016, 17 pages.

Office Action for U.S. Appl. No. 13/926,601, dated May 16, 2016, 9 pgs.

Office Action for U.S. Appl. No. 13/926,601, dated Sep. 2, 2016, 8 pgs.

Office Action for U.S. Appl. No. 13/926,573, dated Sep. 29, 2016, 15 pages.

Office Action for U.S. Appl. No. 13/926,601, dated Jan. 30, 2017, 9 pgs.

Office Action for U.S. Appl. No. 13/926,601, dated May 17, 2017, 9 pgs.

Office Action for U.S. Appl. No. 13/926,601, dated Nov. 1, 2017, 10 pgs.

Notice of Allowance for U.S. Appl. No. 15/610,063, dated Jun. 12, 2018, 6 pages.

Office Action for U.S. Appl. No. 13/926,601, dated Sep. 24, 2018, 9 pgs.

Office Action for U.S. Appl. No. 15/610,063, dated Oct. 16, 2017, 10 pgs.

Office Action for U.S. Appl. No. 13/926,601, dated Mar. 9, 2018, 14 pgs.

Notice of Allowance for U.S. Appl. No. 15/610,063, dated Mar. 15, 2018, 15 pgs.

* cited by examiner

METHOD AND SYSTEM FOR MIGRATING CONTENT BETWEEN ENTERPRISE CONTENT MANAGEMENT SYSTEMS

CROSS REFERENCE TO RELATED APPLICATIONS

This application claims the benefit of U.S. Provisional Patent Application No. 61/782,238 entitled, MIGRATION APPLIANCE, by Michael T. Mohen et al., filed Mar. 14, 2013, the entire contents of which is incorporated herein by reference.

BACKGROUND

An enterprise content management system provides online access to content stored using digital technology, information formerly available only on paper, microfilm, or microfiche. An enterprise content management system generates new metadata about content as the content is checked in and out. Information about how and when content is used can enable an enterprise content management system to acquire new filtering, routing and search pathways, and retention-rule decisions. An enterprise content management system provides access to data about email and instant messaging, which may be used in business decisions. The audit trail generated by an enterprise content management system enhances document security, and provides metrics to help measure productivity and identify efficiency.

An enterprise content management system provides integrated solutions for multiple departments and systems, as many documents may cross multiple departments and affect multiple processes. For example, imaging, document management, and workflow can be combined in a customer service department to enable customer service agents to better resolve customer inquiries. Likewise, an accounting department may access supplier invoices from an electronic resource management system, access purchase orders from an imaging system, and access contracts from a document management system as part of an approval workflow.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
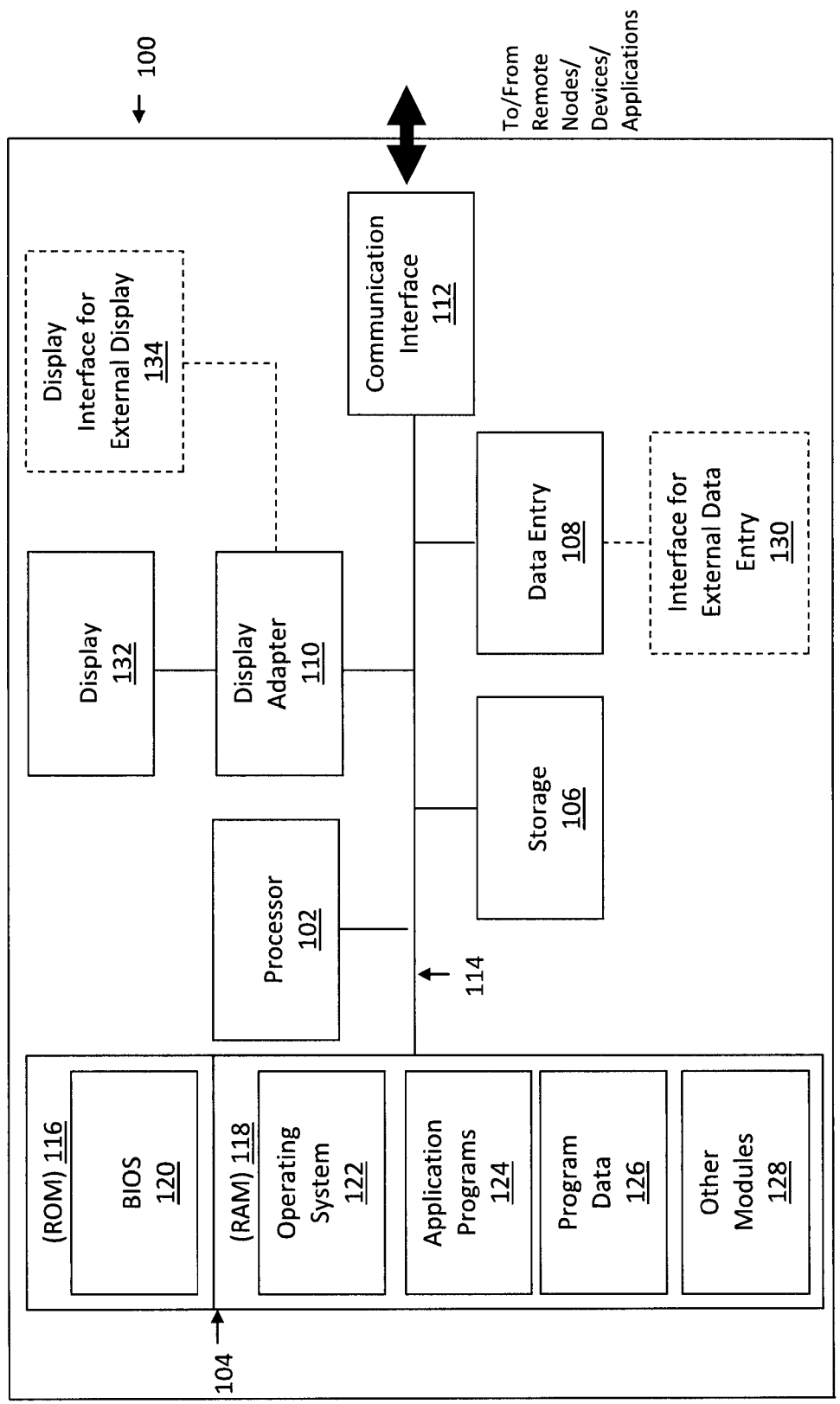
FIG. 1 is a block diagram illustrating an example hardware device in which the subject matter may be implemented.

An organization may need to migrate content from an existing enterprise content system to a new or updated enterprise content management system. In the prior art, some migration tools use an application program interface to migrate an organization's content between enterprise content management systems at a rate of approximately twenty documents per second, a rate which may require months, and in some cases up to a year, to complete the migration of a large amount of content.

Embodiments herein enable migrating content between enterprise content management systems. While the migration appliance can query a source enterprise content management system to identify a source object identifier that uniquely identifies metadata tables for any number of human resources documents, for purposes of explanation, the description below describes embodiments where the migration appliance uses the source object identifier to retrieve the metadata tables from the source enterprise content management system for ten human resources documents.

In this regard, a source object identifier is identified for metadata tables for content for a source enterprise content management system, based on a migration job definition. For example, a migration appliance queries a source enterprise content management system to identify a source object identifier that uniquely identifies metadata tables for, in this example, ten human resources documents that a system user has specified for migration. Metadata tables are retrieved from a source enterprise content management system based on a source object identifier. In this example, a target object identifier is identified for a target enterprise content management system, based on metadata tables and a migration job definition. For example, the migration appliance queries a target enterprise content management system to identify a target object identifier to be used for the metadata tables for the ten human resources documents. For example, the migration appliance creates an object identifier map that maps the source object identifier to the target object identifier. Metadata tables are stored to a target enterprise content management system, based on an object identifier map. For example, the migration appliance uses the target object identifier that corresponds to the source object identifier in the object identifier map to store the metadata tables in the target enterprise content management system.

Content for a source enterprise content management system is retrieved. For example, the migration appliance retrieves the ten human resource documents from the source enterprise content management system. Content is stored as content for a target enterprise content management system. For example, the migration appliance stores the ten human resource documents as content for the target enterprise content management system. The migration appliance directly extracts and loads data at the database level, enabling the migration of thousands of documents per second, more than a hundred-fold performance increase over some prior art migration tools.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for hard link handling for incremental file migration.

In the prior art, some migration tools use an application program interface to migrate an organization's content between enterprise content management systems at a rate of approximately twenty documents per second, a rate which may require months, and in some cases up to a year, to complete the migration of a large amount of content. Embodiments herein provide a migration appliance that directly extracts and loads data at the database level, enabling the migration of thousands of documents per second, more than a hundred-fold performance increase over some prior art migration tools.

Figure 2:
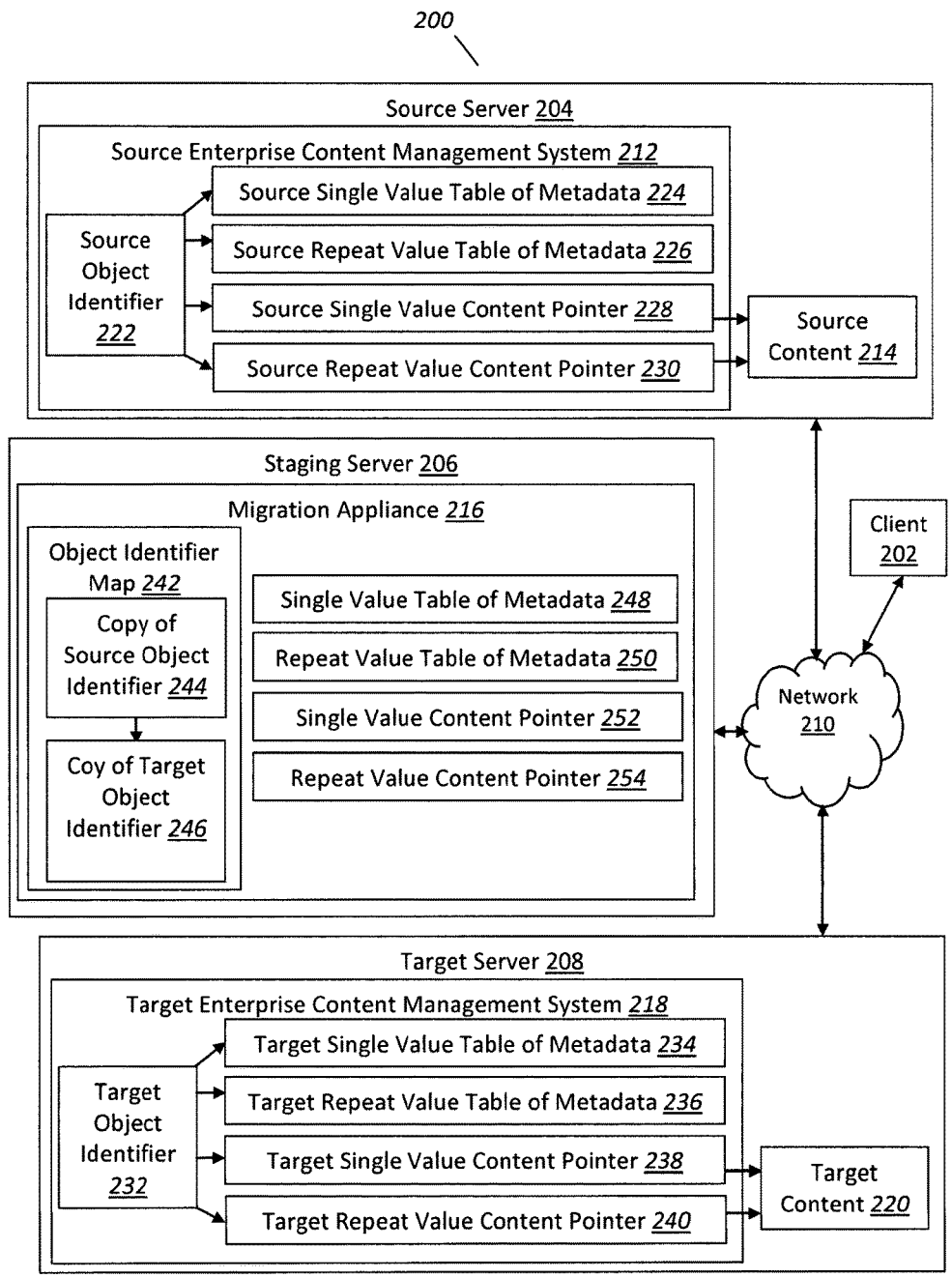
FIG. 2 illustrates a block diagram of an example system for migrating content between enterprise content management systems, under an embodiment.

FIG. 2 illustrates a block diagram of a system that implements migrating content between enterprise management systems, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a source server 204, a staging server 206, and a target server 208 that are provided by a hosting company. The client 202 and the servers 204-208 communicate via a network 210. The source server 204 includes a source enterprise content management system 212 associated with source content 214, the staging server 206 includes a migration appliance 216, and the target server 208 includes a target enterprise content management system 218 associated with target content 220. The migration appliance 216 is a software application that is combined with just enough operating system to run optimally on industry standard hardware, such as the staging server 206. The migration appliance 216 may retrieve at least some of the source content 214 from the source server 204 and store it as the target content 220 on the target server 208. Although the source content 214 is depicted as stored on the source server 204 and the target content 220 is depicted as stored on the target server 208, the source content 214 and the target content 220 may be stored on other servers that are associated with the servers 204 and 208, respectively, but not depicted in FIG. 2. The client 202 and the servers 204-208 may each be substantially similar to the system 100 depicted in FIG. 1.

The source enterprise content management system 212 includes a source object identifier 222 that functions as a primary key to uniquely identify a source single value table of metadata 224, a source repeat value of metadata 226, a source single value content pointer 228, and a source repeat value content pointer 230, with the content pointers 228-230 pointing to the source content 214. Similarly, the target enterprise content management system 212 includes a target object identifier 232 that functions as a primary key to uniquely identify a target single value table of metadata 234, a target repeat value of metadata 236, a target single value content pointer 238, and a target repeat value content pointer 240, with the content pointers 238-240 pointing to the target content 220. The migration appliance 216 includes an object identifier map 242 that maps a copy of the source object identifier 244 to a copy of the target object identifier 246. The migration appliance 216 also includes a single value table of metadata 248, a repeat value of metadata 250, a single value content pointer 252, and a repeat value content pointer 254. Although FIG. 2 depicts only one source object identifier 222, only one target object identifier 232, only one copy of the source object identifier 244, and only one copy of the target object identifier 246 for the purposes of presenting an extremely simplified example, the system 200 may include billions of each of the source object identifier 222, the target object identifier 232, the copy of the source object identifier 244, and the copy of the target object identifier 246, and consequently billions of the corresponding metadata tables 224-230, 234-240, and 248-254.

A system user creates a migration job definition, and defines both users and roles associated with content to be migrated. For example, a system user accesses a web based interface to the migration appliance 216 via the client 202 to create a migration job definition for migrating ten human resource documents from the source content 214 and defines which users and which roles are to have access to the ten human resource documents after the migration. The system user may access a web based interface to the migration appliance 216 via the client 202 to also initiate migration jobs and view reports. Although this example uses only one human resources document type to illustrate a migration of content, enterprise content management systems may have hundreds of different document types. Furthermore, although a human resources document type is described with one single value metadata table, one repeat value metadata table, one single value content pointer, and one repeat value content pointer, document types may have multiple single value metadata tables multiple repeat value metadata tables, multiple single value content pointers, and multiple repeat value content pointers.

A migration appliance identifies a source object identifier for metadata tables for content for a source enterprise content management system, based on a migration job definition. For example, the migration appliance 216 queries the source enterprise content management system 212 to identify the source object identifier 222 of 0001: BA9876543210 that serves as the primary key that uniquely identifies the metadata tables 224-230 for the ten human resources documents that the system user specified for migration from the source content 214. Identifying a source object identifier for metadata tables includes executing a remote procedure call to a database management system associated with a source enterprise content management system based on a migration job definition. For example, the migration appliance 216 executes a remote procedure call to the database manager for the source enterprise content management system 212 to identify the source object identifier 222 that uniquely identifies the source metadata tables 224-230 for the ten human resources documents. In contrast to prior art migration tools that use an inefficient application program interface to migrate documents, which involves the high costs of acquiring sessions to indirectly interact with a database that is several layers below the application program interface, the migration appliance 216 quickly executes efficient remote procedure calls to directly interact with a database at the level of the database. The migration appliance 216 has the memory, capacity, and capability to directly interact with an Oracle® database, a SQL® database, an IBM® DB2® database, or any other type of relational database.

A migration appliance uses object identifiers that uniquely identify metadata tables as part of a consistency checker process which verifies that all of the content requested for migration is migrated, and that the requested content is not migrated more than once. For example, the migration appliance 216 stores the source object identifier 222 in a workload collection which the migration appliance 216 subsequently references when retrieving the metadata tables 224-230 from the source enterprise content management system 212 based on the source object identifier 222. While such a process of storing the source object identifier 222 in a workload collection and subsequently retrieving the source object identifier 222 from the workload collection may appear to be inefficient in this extremely simplified example that uses only one object identifier, the use of a workload collection for storing and retrieving thousands of object identifiers in a real-life example is a highly efficient procedure that is part of the consistency checker process.

Tables of metadata include pointers to content, a single value table, and a repeat value table. For example, the metadata tables 224-230 include the source single value table of metadata 224, the source repeat value table of metadata 226, the source single value content pointer 228, and the source repeat value content pointer 230. The source single value table of metadata 224 specifies single values of metadata associated with the source content 214, such as the corresponding title and the creation date for each of the ten human resource documents. The source repeat value table of metadata 226 specifies repeat values of metadata associated with the source content 214, such as the corresponding multiple authors and the multiple keywords for each of the ten human resource documents. The source single value content pointer 228 and the source repeat value content pointer 230 are pointers to the ten human resource documents in the source content 214, such as //hrdocsfolder// hrdoc9.

A migration appliance retrieves metadata tables from a source enterprise content management system, based on a source object identifier. For example, the migration appliance 216 uses the source object identifier 222 to retrieve the metadata tables 224-230 for the ten human resources documents from the source content 214. The migration appliance 216 retrieves the metadata tables 224-230 via the database's object view on a table-by-table basis. An object view is a highly optimized view of requested data that may provide metadata tables and additional data for the metadata tables. An object view facilitates co-existence of a relational database with an object-oriented appliance, and a gradual migration path for legacy data. Retrieving metadata tables from a source enterprise content management system includes storing the metadata tables in a NoSQL non-relational database hosted in a staging environment. For example, after the migration appliance 216 retrieves the metadata tables 224-230 for the ten human resources documents from the source content 214, the migration appliance 216 stores the metadata tables 224-230 as Java Script Object Notation (JSON) metadata in the metadata tables 248-254 in a NoSQL non-relational database, such as a Mongo® database, hosted in the staging server 206. In contrast to prior art migration tools that execute on a source system and/or a target system to inefficiently migrate metadata tables in small batches, such as in spreadsheet files, the migration appliance 216 quickly and efficiently stores metadata tables to and retrieves metadata tables from a NoSQL non-relational database, which enables significant amounts of metadata to be migrated between enterprise content management systems in a very small amount of time. Furthermore, multiple instances of the migration appliance 216 may execute concurrently to expedite the migration of content between enterprise content management systems.

A migration appliance identifies a target object identifier for a target enterprise content management system, based on metadata tables and a migration job definition. For example, the migration appliance 216 needs a placeholder object identifier in the target enterprise content management system 218 for the metadata tables 248-254 to be migrated, so the migration appliance 216 queries the target enterprise content management system 218 to identify the target object identifier 232 of 0002:456789ABCDEF to be used as the primary key for the metadata tables 234-240 for the ten human resources documents to be stored in the target content 220. Identifying a target object identifier for metadata tables includes executing a remote procedure call to a database management system associated with a target enterprise content management system based on a migration job definition. For example, the migration appliance 216 executes a remote procedure call to the database manager for the target enterprise content management system 218 to identify the target object identifier 232 that is to function as the primary key that uniquely identifies the target metadata tables 234-240 for the ten human resources documents. The database manager for the target enterprise content management system 218 may be an Oracle® database, a SQL® database, an IBM® DB2® database, or any other type of relational database.

A migration appliance creates an object identifier map that maps a source object identifier to a target object identifier.

For example, the migration appliance 216 creates an object identifier map 242 that maps the copy of the source object identifier 244 to the copy of the target object identifier 246. The object identifier map 242 functions as a part of the workload collection previously mentioned. While such a process of creating an object identifier map 242 that maps only one source object identifier to only one target object identifier may appear to be inefficient in this extremely simplified example that uses only one object identifier, the use of an object identifier map for mapping thousands of source object identifiers to thousands of target object identifiers in a real-life example is a highly efficient procedure that is part of the consistency checker process. If the object types in the source content 214 are to be morphed into different object types that are to be stored as the target content 220, the migration appliance 216 executes a transformation tool to transform these object types to be morphed and migrated.

A migration appliance retrieves metadata tables from a NoSQL non-relational database hosted in a staging environment. For example, the migration appliance 216 retrieves the metadata tables 248-254 from a NoSQL non-relational database hosted in the staging server 206. A migration appliance stores metadata tables to a target enterprise content management system, based on an object identifier map. For example, the migration appliance 216 uses the copy of the target object identifier 246 that corresponds to the copy of the source object identifier 244 in the object identifier map 242 to store the metadata tables 248-254 as the target metadata tables 234-240 in the target enterprise content management system 218 on a table-by-table basis. In contrast to retrieving the metadata tables 224-230 via the database's object view, the migration appliance 216 stores the metadata tables 248-254 in the target enterprise content management system 218 based on the placeholder target object identifier 232 that identifies the target metadata tables 234-240.

Now that all of the metadata for the requested content has been migrated, the requested content may be migrated. A migration appliance retrieves content for a source enterprise content management system. For example, the migration appliance 216 retrieves the ten human resource documents from the source content 214 for the source enterprise content management system 212. A migration appliance stores content as content for a target enterprise content management system. For example, the migration appliance 216 stores the ten human resource documents to the target content 220 for the target enterprise content management system 218. The migration appliance 216 directly extracts and loads data at the database level, enabling the migration of thousands of documents per second, more than a hundred-fold performance increase over some prior art migration tools.

Figure 3:
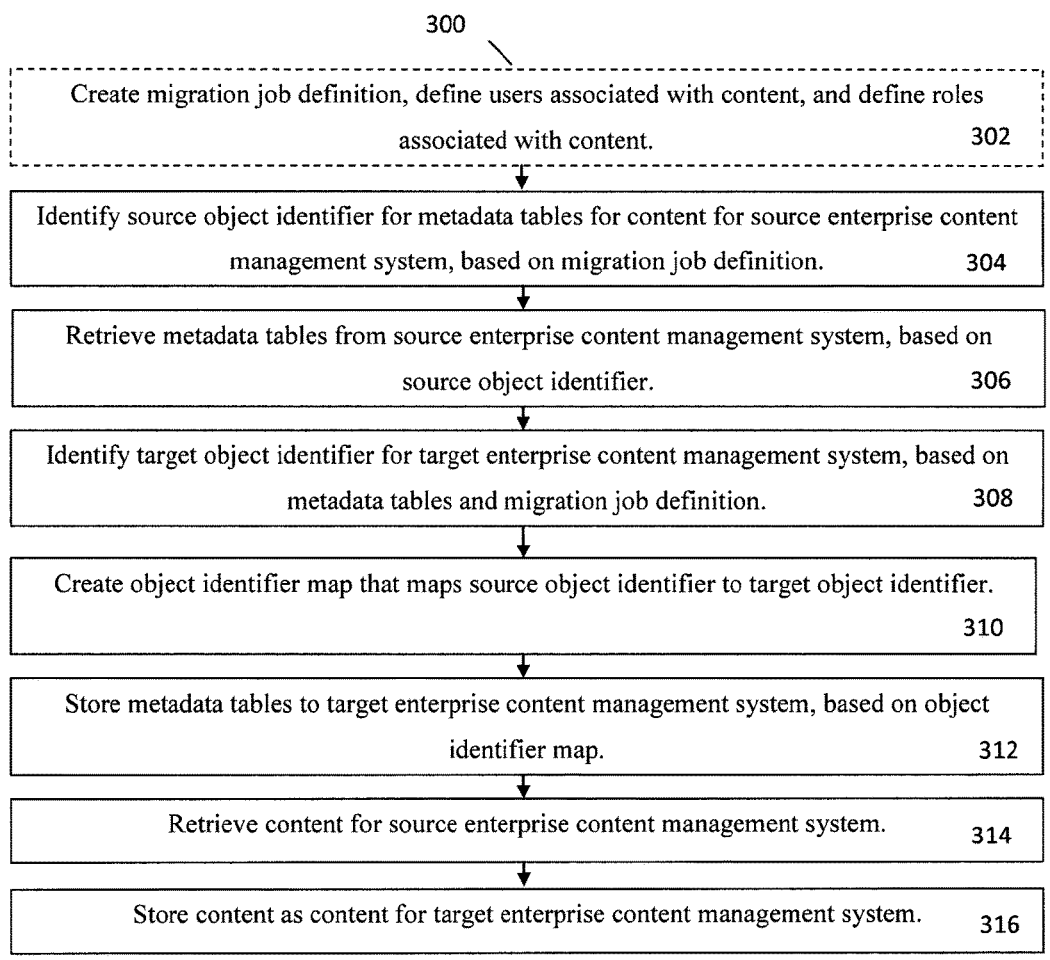
FIG. 3 is a flowchart that illustrates a method of migrating content between enterprise content management systems, under an embodiment.

FIG. 3 is a flowchart that illustrates a method of migrating content between enterprise content management systems. Flowchart 300 illustrates method acts illustrated as flowchart blocks for certain steps involved in and/or between the client 202 and/or the servers 204-208 of FIG. 2.

A migration job definition is optionally created, and both users and roles associated with content are optionally defined, act 302. For example, a system user access the web-based interface for the migration appliance 216 via the client 202 to create a migration job definition for migrating ten human resource documents from the source content 214, and defines which users and which roles are to have access to the ten human resource documents after migration.

A source object identifier is identified for metadata tables for content for a source enterprise content management system, based on a migration job definition, act 304. For example, the migration appliance 216 queries the source enterprise content management system 212 to identify the source object identifier 222 that functions as the primary key that uniquely identifies the metadata tables 224-230 for the ten human resources documents that the system user specified for migration from the source content 214.

Metadata tables are retrieved from a source enterprise content management system, based on a source object identifier, act 306. For example, the migration appliance 216 uses the source object identifier 222 to retrieve the metadata tables 224-230 for the ten human resources documents for the source enterprise content management system 212.

A target object identifier is identified for a target enterprise content management system, based on metadata tables and a migration job definition, act 308. For example, the migration appliance 216 queries the target enterprise content management system 218 to identify the target object identifier 232 to be used for the metadata tables 248-254 for the ten human resources documents to be stored in the target enterprise content management system 218.

An object identifier map is created that maps a source object identifier to a target object identifier, act 310. For example, the migration appliance 216 creates an object identifier map 242 that maps the copy of the source object identifier 244 to the copy of the target object identifier 246.

Metadata tables are stored to a target enterprise content management system, based on an object identifier map, act 312. For example, the migration appliance 216 uses the copy of the target object identifier 246 that corresponds to the copy of the source object identifier 244 in the object identifier map 242 to store the metadata tables 248-254 as the target metadata tables 234-240 in the target enterprise content management system 218.

Content for a source enterprise content management system is retrieved, act 314. For example, the migration appliance 216 retrieves the ten human resource documents from the source content 214 for the source enterprise content management system 212.

Content is stored as content for a target enterprise content management system, act 316. For example, the migration appliance 216 stores the ten human resource documents to the target content 220 for the target enterprise content management system 218.

Although FIG. 3 depicts the acts 302-316 occurring in a specific order, the acts 302-316 may occur in another order. Embodiments herein enable migrating content between enterprise content management systems. The migration appliance 216 directly extracts and loads data at the database level, enabling the migration of thousands of documents per second, more than a hundred-fold performance increase over some prior art migration tools.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for migrating content between enterprise content management systems, the system comprising:
    a processor; and
    a processor-based application that is executable by the processor to:
        based on a migration job definition, execute a first remote procedure call to a source database management system associated with a source enterprise content management system to directly interact with a source database at a level of the source database to identify a source object identifier that is a primary key that uniquely identifies a plurality of source metadata tables stored in the source enterprise content management system for content stored in the source enterprise content management system;
        retrieve the plurality of source metadata tables from the source enterprise content management system, based on using the source object identifier as the primary key that uniquely identifies the plurality of source metadata tables;
        execute a second remote procedure call to a target database management system associated with a target enterprise content management system to identify a target object identifier based on the plurality of source metadata tables and the migration job definition, wherein the target object identifier is a placeholder object identifier in the target enterprise content management system for the source metadata tables to be migrated;
        create an object identifier map that maps the source object identifier that functions, at the source enterprise content management system, as the primary key that uniquely identifies the plurality of source metadata tables to the target object identifier that is the placeholder object identifier in the target enterprise content management system for the source metadata tables to be migrated;
        store the plurality of source metadata tables to the target enterprise content management system, based on the object identifier map;
        retrieve the content for the source enterprise content management system; and
        store the content as content for the target enterprise content management system.

2. The system of claim 1, wherein the plurality of source metadata tables include a pointer to the content, a single value table, and a repeat value table, wherein the repeat value table specifies multiple keywords for each content item included in the content.

3. The system of claim 1, wherein retrieving the plurality of source metadata tables from the source enterprise content management system comprises storing the metadata tables in a NoSQL non-relational database hosted in a staging environment.

4. The system of claim 1, wherein storing the plurality of source metadata tables to the target enterprise content management system comprises retrieving the plurality of source metadata tables from a NoSQL non-relational database hosted in a staging environment.

5. The system of claim 1, wherein the processor-based application is further executable by the processor to create the migration job definition, define users associated with the content, and define roles associated with the content.

6. A computer-implemented method for migrating content between enterprise content management systems, the method comprising:
    based on a migration job definition, executing a first remote procedure call to a source database management system associated with a source enterprise content management system to directly interact with a source database at a level of the source database to identify a source object identifier that is a primary key that uniquely identifies a plurality of source metadata tables stored in the source enterprise content management system for content stored in the source enterprise content management system;
    retrieving the plurality of source metadata tables from the source enterprise content management system, based on using the source object identifier as the primary key that uniquely identifies the plurality of source metadata tables;
    executing a second remote procedure call to a target database management system associated with a target enterprise content management system to identify a target object identifier based on the plurality of source metadata tables and the migration job definition, the target object identifier serving as a placeholder object identifier in the target enterprise content management system for the source metadata tables to be migrated;
    creating an object identifier map that maps the source object identifier that functions, at the source enterprise content management system, as the primary key that uniquely identifies the plurality of source metadata tables to the target object identifier that serves as the placeholder object identifier in the target enterprise content management system for the source metadata tables to be migrated;
    storing the plurality of source metadata tables to the target enterprise content management system, based on the object identifier map;
    retrieving the content for the source enterprise content management system; and
    storing the content as content for the target enterprise content management system.

7. The computer-implemented method of claim 6, wherein the plurality of source metadata tables include a pointer to the content, a single value table, and a repeat value table.

8. The computer-implemented method of claim 6, wherein retrieving the plurality of source metadata tables from the source enterprise content management system comprises storing the plurality of source metadata tables in a NoSQL non-relational database hosted in a staging environment.

9. The computer-implemented method of claim 6, wherein storing the plurality of source metadata tables to the target enterprise content management system comprises retrieving the plurality of source metadata tables from a NoSQL non-relational database hosted in a staging environment.

10. The computer-implemented method of claim 6, wherein the method further comprises creating the migration job definition, defining users associated with the content, and defining roles associated with the content.

11. A computer program product, comprising a non-transitory computer-readable medium having a computer-readable program code embodied therein, the computer-readable program code executable by one or more processors to implement a method for migrating content between enterprise content management systems, the method comprising:
  based on a migration job definition, executing a first remote procedure call to a source database management system associated with a source enterprise content management system to directly interact with a source database at a level of the source database to identify a source object identifier that is a primary key that uniquely identifies a plurality of source metadata tables stored in the source enterprise content management system for content stored in the source enterprise content management system;
  retrieving the plurality of source metadata tables from the source enterprise content management system, based on using the source object identifier as the primary key that uniquely identifies the plurality of source metadata tables;
  executing a second remote procedure call to a target database management system associated with a target enterprise content management system to identify a target object identifier based on the plurality of source metadata tables and the migration job definition, the target object identifier serving as a placeholder object identifier in the target enterprise content management system for the source metadata tables to be migrated;
  creating an object identifier map that maps the source object identifier that functions, at the source enterprise content management system, as the primary key that uniquely identifies the plurality of source metadata tables to the target object identifier that serves as the placeholder object identifier in the target enterprise content management system for the source metadata tables to be migrated;
  storing the plurality of source metadata tables to the target enterprise content management system, based on the object identifier map;
  retrieving the content for the source enterprise content management system; and storing the content as content for the target enterprise content management system.

12. The computer program product of claim 11, wherein the plurality of source metadata tables include a pointer to the content, a single value table, and a repeat value table.

13. The computer program product of claim 11, wherein retrieving the plurality of source metadata tables from the source enterprise content management system comprises storing the plurality of source metadata tables in a NoSQL non-relational database hosted in a staging environment, and wherein storing the plurality of source metadata tables to the target enterprise content management system comprises retrieving the plurality of source metadata tables from the NoSQL non-relational database.

14. The computer program product of claim 11, wherein the method further comprises creating the migration job definition, defining users associated with the content, and defining roles associated with the content.

15. The system of claim 1, wherein retrieving the plurality of source metadata tables from the source enterprise content management system includes retrieving the plurality of source metadata tables from the source enterprise content management system via an object view, on a table-by-table basis.

16. The computer-implemented method of claim 6, wherein retrieving the plurality of source metadata tables from the source enterprise content management system includes retrieving the plurality of source metadata tables from the source enterprise content management system via an object view, on a table-by-table basis.

17. The computer program product of claim 11, wherein retrieving the plurality of source metadata tables from the source enterprise content management system includes retrieving the plurality of source metadata tables from the source enterprise content management system via an object view, on a table-by-table basis.

* * * * *